United States Patent
Li et al.

(10) Patent No.: US 7,016,881 B2
(45) Date of Patent: Mar. 21, 2006

(54) METHOD FOR BOOSTING THE PERFORMANCE OF MACHINE-LEARNING CLASSIFIERS

(75) Inventors: ZiQing Li, Beijing (CN); ZhenQiu Zhang, Beijing (CN); Long Zhu, FuJian (CN)

(73) Assignee: Microsoft Corp., Redmond, WA (US)

( * ) Notice: Subject to any disclaimer, the term of this patent is extended or adjusted under 35 U.S.C. 154(b) by 11 days.

(21) Appl. No.: 11/067,284

(22) Filed: Feb. 25, 2005

(65) Prior Publication Data

US 2005/0144149 A1   Jun. 30, 2005

Related U.S. Application Data

(63) Continuation of application No. 10/091,109, filed on Mar. 4, 2002.

(60) Provisional application No. 60/339,545, filed on Dec. 8, 2001.

(51) Int. Cl.
*G06F 15/18* (2006.01)

(52) U.S. Cl. .......................... 706/12; 706/25; 706/47; 706/48

(58) Field of Classification Search .................. 706/12, 706/25, 47, 48; 382/157; 700/48
See application file for complete search history.

(56) References Cited

OTHER PUBLICATIONS

Robert E. Schapire et al, Improved Boosting Algorithms Using Confidence-Rated Predictions, 1998, Machine Learning, In Proceedings of the Eleventh Annual Conference on Computational Learning Theory, p 80-91.*

P. Pudil et al., Floating Search Methods for Feature Selection With Nonmonotonic Criteria Functions, Department of Electronic and Electrical Engineering, University of Surrey Guildford, UK, 1994.*

* cited by examiner

*Primary Examiner*—Joseph P. Hirl
(74) *Attorney, Agent, or Firm*—Lyon & Harr, LLP; Katrina A. Lyon (57) ABSTRACT

A novel statistical learning procedure that can be applied to many machine-learning applications is presented. Although this boosting learning procedure is described with respect to its applicability to face detection, it can be applied to speech recognition, text classification, image retrieval, document routing, online learning and medical diagnosis classification problems.

1 Claim, 6 Drawing Sheets

METHOD FOR BOOSTING THE PERFORMANCE OF MACHINE-LEARNING CLASSIFIERS

CROSS-REFERENCE TO RELATED APPLICATIONS

This is a continuation of a prior application entitled "A METHOD FOR BOOSTING THE PERFORMANCE OF MACHINE-LEARNING CLASSIFIERS" which was assigned Ser. No. 10/091,109 and was filed Mar. 4, 2002, which claimed the priority of provisional application No. 60/339,545 filed on Dec. 1, 2001.

BACKGROUND

1. Technical Field

This invention is directed towards a statistical learning procedure that can be applied to many machine-learning applications such as, for example, face detection, image retrieval, speech recognition, text classification, document routing, on-line learning and medical diagnosis. Although the statistical learning procedure of the present invention is described as applied to a face detection system, the process can be used for boosting the performance of classifiers in any type of classification problem.

2. Background Art

Boosting is an approach to machine-learning classification problems that has received much attention of late. Boosting algorithms have recently become popular because they are simple, elegant, powerful and easy to implement. Boosting procedures have been used in many different applications. For instance, Fan, Stolfo and Zhang [2] introduced boosting, namely a boosting algorithm called Ada-Boost, into a distributed online learning application. Iyer, Lewis, Schapire, Singer and Singhil [8] applied boosting to document routing, employing a boosting procedure for classifying and ranking documents in the context of Information Retrieval (IR). Moreno, Logan and Raj [13] employed a boosting classification algorithm in the confidence scoring of data in speech recognition application. They derived feature vectors from speech recognition lattices and fed them into a boosting classifier. This classifier combined hundreds of very simple 'weak learners' and derived classification rules that reduced the confidence error rate by up to 34 percent. Schapire and Singer [23] used a family of boosting algorithms to perform text and speech categorization tasks. Sebastiani, Sperduti and Valdambrini [25] also applied boosting to text categorization. Tieu and Viola [30] applied boosting to image retrieval.

In most classification problems, feature vectors are composed and fed into one or more classifiers. There are usually just a few types of features used, such as, for example, color and oriented edges found in a training image. Boosting typically combines hundreds or thousands of very simple classifiers, called 'weak learners', by using a weighted sum. A classification procedure is iteratively applied to a set of weighted feature vectors. Each weak learner is called upon to solve a sequence of learning problems. At first each feature vector is assigned an equal weight (or a weight depending on its prior probability). At each iteration, a classifier is learned and the feature vectors that are classified incorrectly have their weights increased, while those that are correctly classified have their weights decreased. That is, in each subsequent problem examples are reweighted in order to emphasize those which were incorrectly classified by the previous weak classifier. Each classifier focuses its attention on those vectors on which the previous classifier fails. The concept is that feature vectors that are difficult to classify receive more attention on subsequent iterations.

The classifier learned at each iteration is called a "weak classifier". A weak classifier is one that employs a simple learning algorithm (and hence a fewer number of features) and is not expected to classify the training data very well. Weak classifiers have the advantage of allowing for very limited amounts of processing time to classify an input. The final classifier, the "strong classifier", is formed as a weighted sum of the weak classifiers learned at each iteration. One important goal for many machine-learning applications is that the final classifiers depend only on a small number of features. A classifier which depends on a few features will be more efficient to evaluate a very large database, requiring less processing time and resources. Furthermore, the use of boosting classifiers with the choice of weak learners offers the advantage of being less sensitive to spurious features. It has been shown that the training error of a strong classifier approaches zero exponentially in the number of iterations.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The present invention is directed toward a procedure that iteratively refines results obtained by a statistically based boosting algorithm to make a strong classifier which is better than can be obtained by the original boosting algorithm in the sense that fewer features are needed and higher accuracy is achieved for many different types of classification problems. The system and method, named FloatBoost, uses a novel method to select an optimum feature set to train weak classifiers based on the selected optimal features, and thereby to construct a strong classifier by linearly combining the learned set of weak classifiers. The boosting algorithm of the present invention leads to a strong classifier of better performance than obtained by many boosting algorithms, such as, for example, AdaBoost, in the sense that fewer features are needed and higher accuracy is achieved. This statistical learning procedure can be applied to many machine-learning applications where boosting algorithms have been employed, such as, for example, face detection, image retrieval, speech recognition, text classification, document routing, on-line learning and medical diagnosis.

In the FloatBoost system and method, simple features are devised on which the classification is performed. Every classifier, or cascade of classifiers, is learned from training examples using FloatBoost. FloatBoost expands upon the AdaBoost procedure. AdaBoost is a sequential forward search procedure using the greedy selection strategy. Its heuristic assumption in the monotonicity, i.e. that when adding a new feature to the current set, the value of the performance criterion does not decrease. A straight sequential selection method like sequential forward search (SFS) or sequential backward search (SBS) adds or deletes one feature at a time. To make this work well, the monotonicity property has to be satisfied by the performance criterion function. However, this is usually not the case for many types of the performance criterion functions such as normally used in AdaBoost. Therefore, AdaBoost suffers from the non-monotonicity problem as a sequential search method.

The Floating Search is a class of feature selection methods that allows an adaptive number of backtracking steps to deal with problems with non-monotonic criteria. While AdaBoost constructs a strong classifier from weak classifiers using purely sequential forward search, FloatBoost allows backtracking search. This results in higher classification accuracy with a reduced number of weak classifiers needed for the strong classifier.

The boosting process of the present invention involves inputting a set of training examples, a prescribed maximum number of weak classifiers, a cost function capable of measuring the overall cost (or overall quality of the strong classifier), and an acceptable maximum cost. A set of candidate weak classifiers is computed, each classifier being associated to a particular feature of the training examples. (A weak classifier is one that employs a single learning algorithm and hence one or a few number of features.) It is then determined which of the set of weak classifiers is the most significant weak classifier given the selected ones. The most significant classifier is based on the feature that when working together with the existing ones is most likely to predict correctly the classification labels of the training examples. This most significant classifier is then added to a current set of optimal weak classifiers. A determination is then made as to which of the current set of optimal weak classifiers is the least significant classifier. The least significant classifier is the one which when removed will lead to improvement of the overall classification performance. The overall cost for the current set of optimal weak classifiers is computed using the cost function. The least significant classifier for the current set of optimal weak classifiers is then conditionally removed and the overall cost for the current set of optimal weak classifiers is then re-computed, less the least significant classifier. It is then determined whether the removal of the least significant classifier results in a lower overall cost. Whenever it is determined that the removal of the least significant classifier results in a lower overall cost, the least significant classifier is eliminated. While keeping the earlier optimal weak classifiers unchanged, each classifier in the current set of optimal weak classifiers associated with a feature added subsequent to the eliminated classifier is then recomputed. The foregoing actions of computing the overall cost for the current set of optimal weak classifiers using the cost function, through recomputing each classifier in the current set of optimal classifiers associated with a feature added subsequent to the eliminated classifier while keeping the earlier optimal weak classifiers unchanged, are repeated until it is determined the removal of the least significant classifier does not result in a lower overall cost. At this point, the last identified least significant classifier is then reinstated to the current set of optimal weak classifiers. Next it is determined if the number of weak classifiers in the current set of optimal weak classifiers equals the prescribed maximum number of weak classifiers or the last computed overall cost for the current set of optimal weak classifiers exceeds the acceptable maximum cost. Whenever it is determined that the number of weak classifiers in the current set of optimal weak classifiers does not equal the prescribed maximum number of weak classifiers and the last computed overall cost for the current set of optimal weak classifiers exceeds the acceptable maximum cost, the foregoing process starting with determining which of the set of weak classifiers is the most significant classifier is repeated. This continues until it is determined that the number of weak classifiers in the current set of optimal weak classifiers does equal the prescribed maximum number of weak classifiers or the last computed overall cost for the current set of optimal weak classifiers becomes lower than the maximum allowable cost, at which point the sum of the individual weak classifiers is output as the trained strong classifier.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplar Operating Environment

Figure 1:
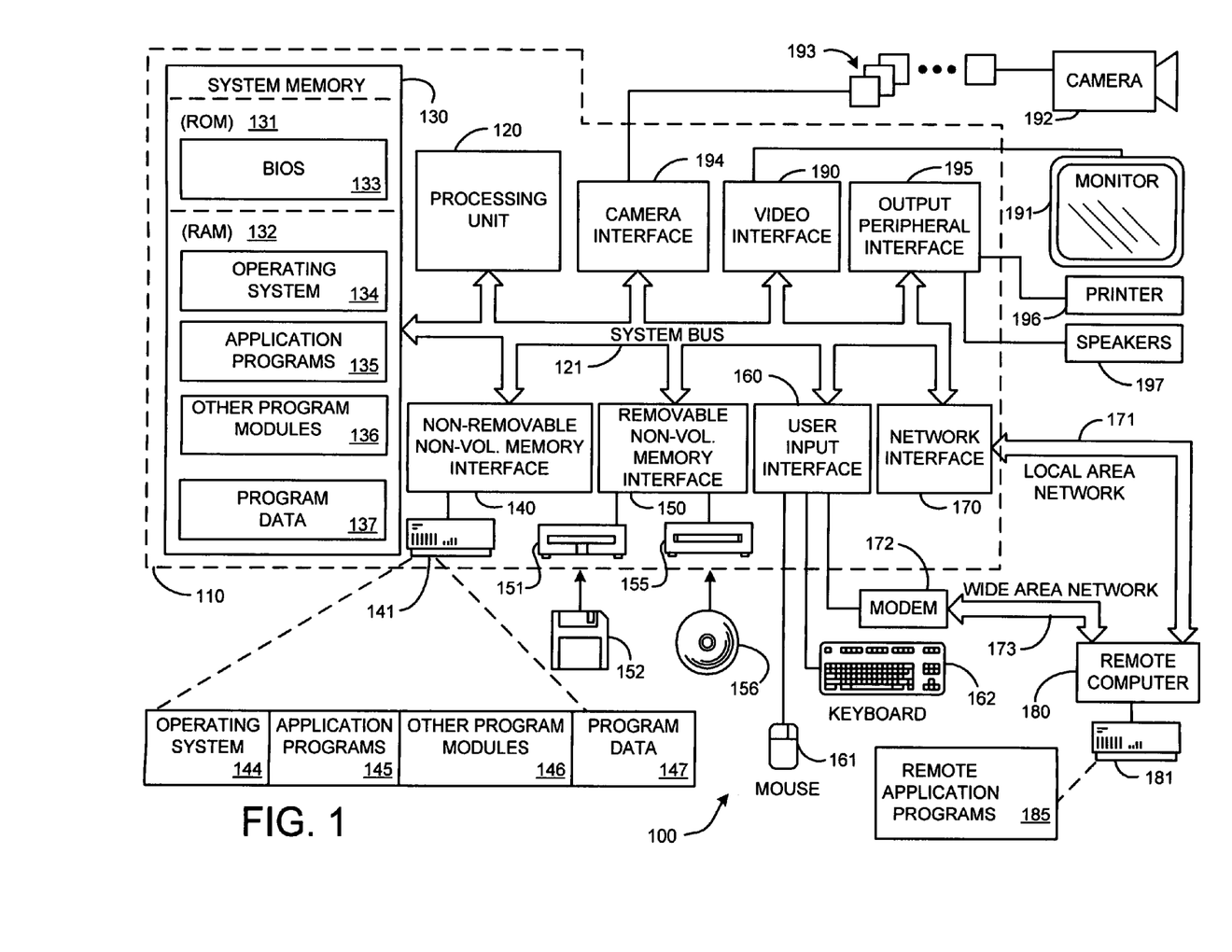
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM)b 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 The FloatBoost Learning Procedure

The FloatBoost learning procedure is a statistically-based boosting procedure that makes it possible to train accurate classifiers in many different types of classification problems. FloatBoost uses a novel method to select optimum features and to train classifiers. It boosts classification performance by linearly combining a set of weak classifiers to form a strong classifier.

2.1 Overview.

Figure 2A:
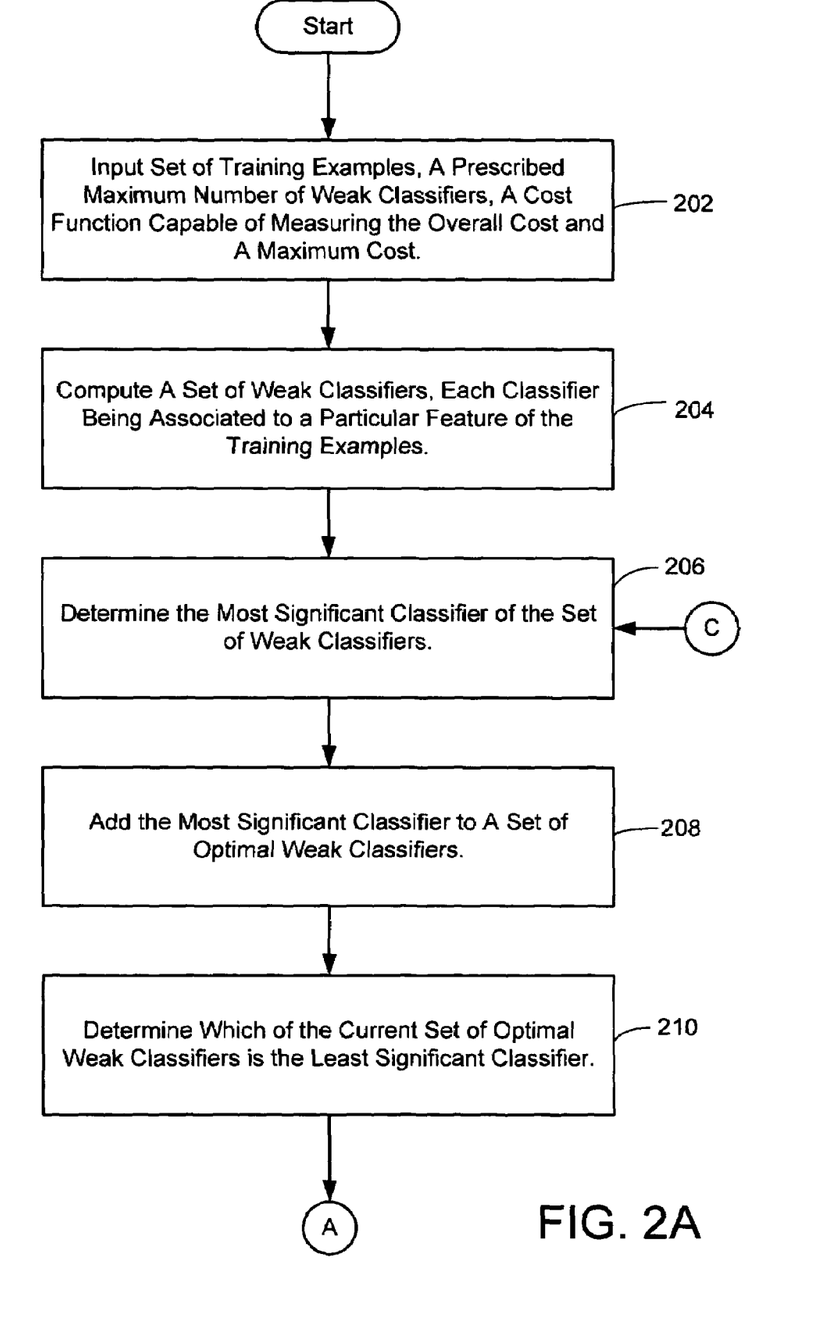
FIG. 2A is a flow diagram of the boosting process of the system and method of the invention.
Figure 2B:
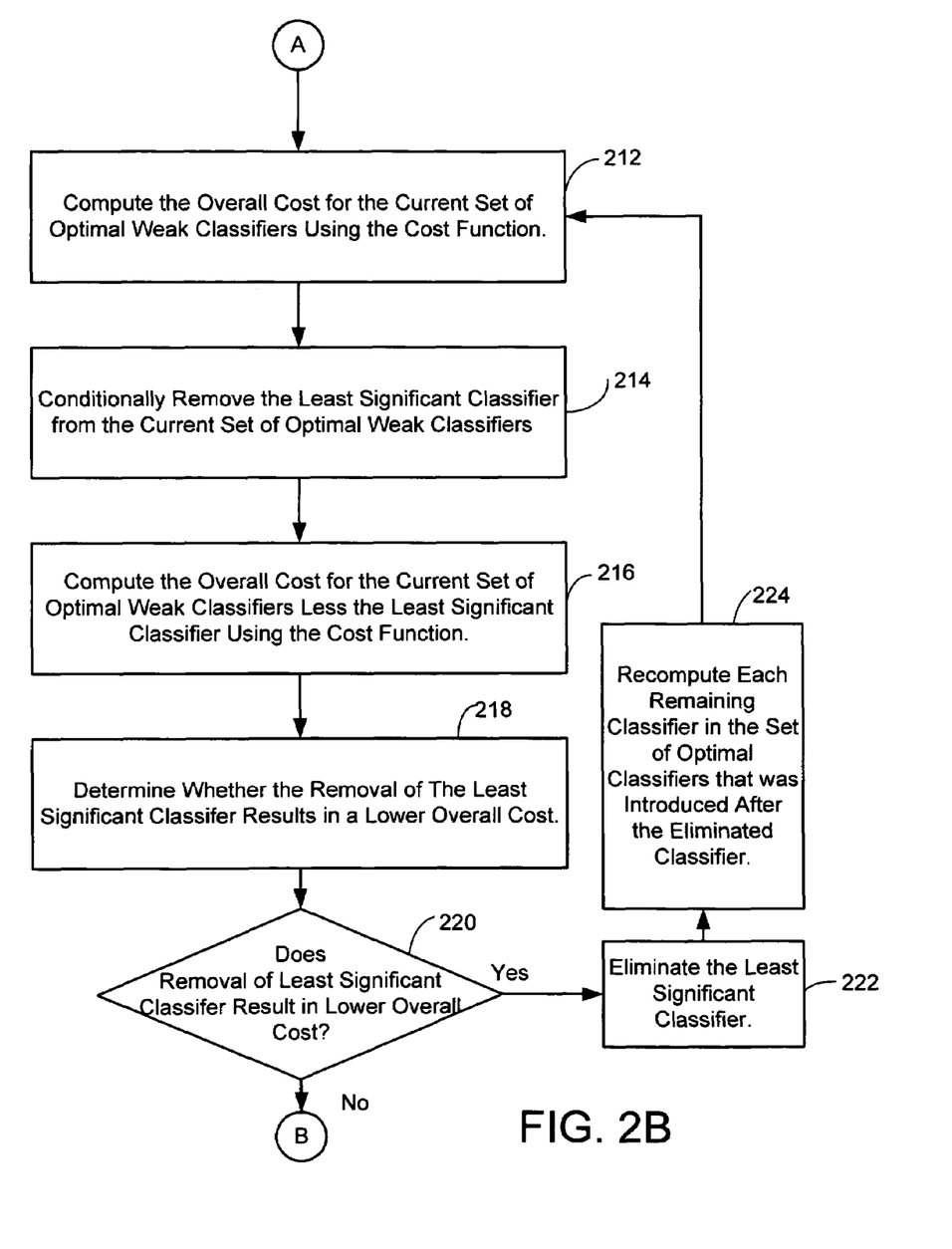
FIG. 2B is a continuation of the flow diagram of the boosting process of the shown in FIG. 2A.
Figure 2C:
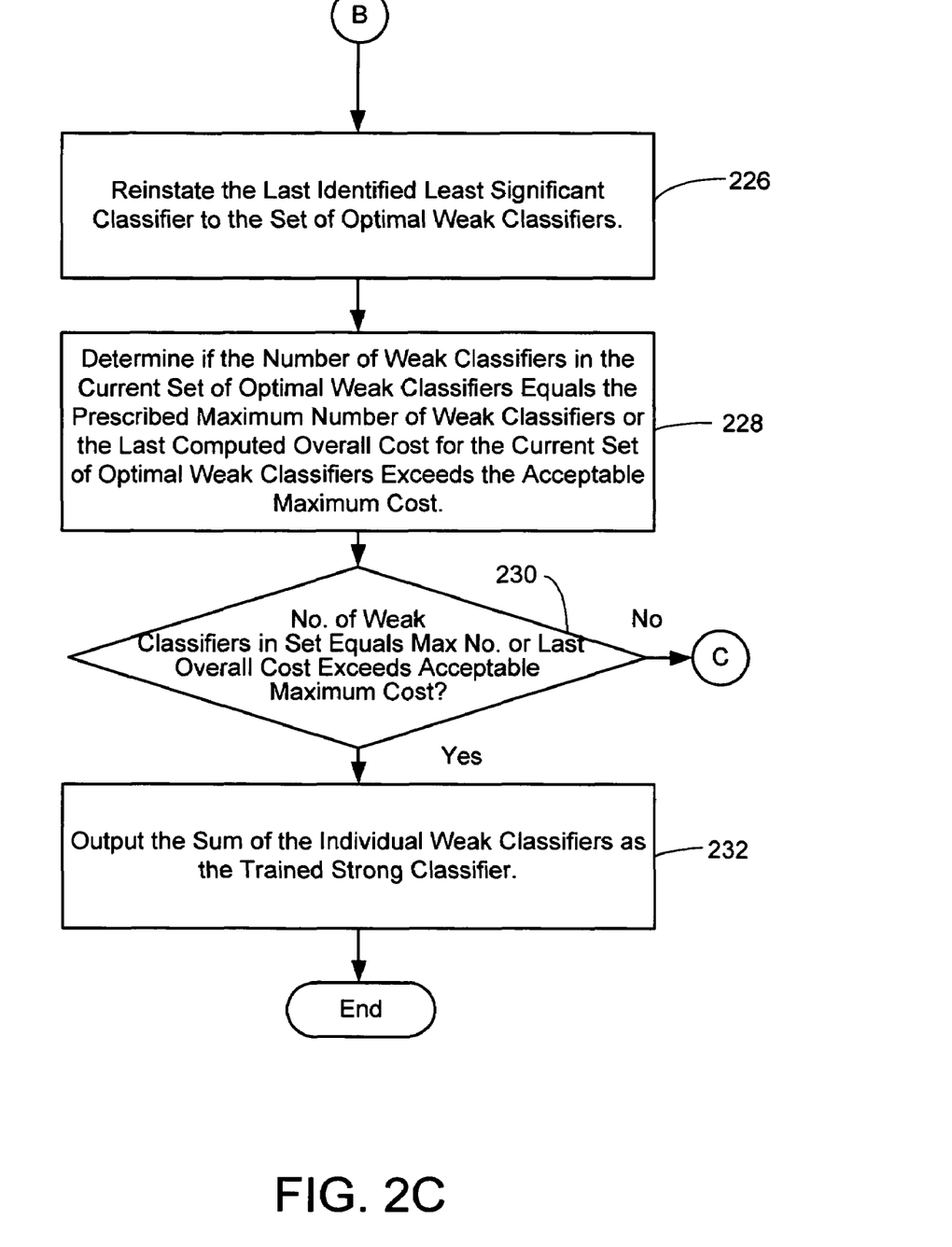
FIG. 2C is a continuation of the flow diagram of the boosting process shown in FIGS. 2A and 2B.

In the most general sense, as shown in FIG. 2A, the boosting process of the present invention involves inputting a set of training examples, a prescribed maximum number of weak classifiers, a cost function capable of measuring the overall cost, and an acceptable maximum cost (process action 202). As shown in process action 204, a set of weak classifiers is computed, each classifier being associated to a particular feature of the training examples. A weak classifier is one that employs a single learning algorithm and hence one or a few number of features. It is then determined which of the set of weak classifiers is the most significant classifier (process action 206). The most significant classifier includes the feature that is the most likely to predict whether a training example matches the classification of a particular classifier. This most significant classifier is then added to a current set of optimal weak classifiers, as indicated by process action 208. A determination is then made as to which of the current set of optimal weak classifiers is the least significant classifier (process action 210). The least significant classifier includes the feature when matching that is the least likely to predict whether a training example matches the classification of a particular classifier. The overall cost for the current set of optimal weak classifiers is next computed, as shown in process action 212 of FIG. 2B, using the cost function. The least significant classifier for the current set of optimal weak classifiers is then conditionally removed (process action 214) and the overall cost for the current set of optimal weak classifiers is computed, less the least significant classifier, using the cost function (process action 216). It is then determined whether the removal of the least significant classifier results in a lower overall cost (process action 218). Whenever it is determined that the removal of the least significant classifier results in a lower overall cost (process action 220), the least significant classifier is eliminated (process action 222). While keeping the earlier optimal weak classifiers unchanged, each classifier in the current set of optimal weak classifiers associated with a feature added subsequent to the eliminated classifier is recomputed, as shown in process action 224. The foregoing actions of computing the overall cost for the current set of optimal weak classifiers (process action 204), through recomputing each remaining classifier in the current set of optimal classifiers associated with a feature added subsequent to the eliminated classifier (process action 224), are repeated until it is determined the removal of the least significant classifier does not result in a lower overall cost. The last identified least significant classifier of the current set of optimal weak classifiers is then reinstated (process action 226). Next, it is determined if the number of weak classifiers in the current set of optimal weak classifiers equals the prescribed maximum number of weak classifiers or the last computed overall cost for the current set of optimal weak classifiers exceeds the acceptable maximum cost, as shown in process action 228. Whenever it is determined that the number of weak classifiers in the current set of optimal weak classifiers does not equal the prescribed maximum number of weak classifiers or the last computed overall cost for the current set of optimal weak classifiers exceeds the acceptable maximum cost (process action 230), the foregoing process starting with determining which of the set of weak classifiers is the most significant classifier (process action 206) is repeated. This continues until it is determined that the number of weak classifiers in the current set of optimal weak classifiers does equal the prescribed maximum number of weak classifiers or the last computed overall cost for the current set of optimal weak classifiers becomes lower than the maximum allowable cost, at which point the sum of the individual weak classifiers is output as the trained strong classifier (process action 232).

More specifically, the FloatBoost learning procedure is described as follows. Let $\mathcal{H}_M = \{h_1 \ldots h_M\}$ be the so far best subset of M weak classifiers; $J(H_M)$ is the criterion which measures the overall cost of the classification function $$H_M(x) = \sum_{m=1}^{M} h_m(x)$$

build on $\mathcal{H}_M$; $J_m^{min}$ be the minimum cost achieved so far with a linear combination of m weak classifiers for $m=1, \ldots, M_{max}$ (which are initially set to a large value before the iteration starts). As shown below, this procedure involves training inputs, initialization, forward inclusion, conditional exclusion and output.

0. (Input)
(1) Training examples $Z=\{(x_1; y_1), \ldots, (x_N; y_N)\}$, where $N=a+b$; of which a examples have $y_i=+1$ and b examples have $y_i=-1$;
(2) The maximum number $M_{max}$ of weak classifiers to be combined;
(3) The cost function $J(H_M)$ (e.g., error rate made by $H_M$);

(4) The acceptable cost J*

1. (Initialization)

(1)

$$w_i^{(0)} = \frac{1}{2a}$$

for those examples with $y_i=++1$ or $$w_i^{(0)} = \frac{1}{2b}$$

for those examples with yi=−1;

(2) $J_m^{min}$=max-value (for m=1, ... ,$M_{max}$)M=0, $H_0$={ };

2. (Forward Inclusion)
   (1) M←M+1;
   (2) Choose $h_M$ according to Eq.8;
   (3) Update $w_i^{(M)} \leftarrow w_i^{(M)} \exp[-y_i h_M(x_i)]$, and normalize to $\Sigma\, w_i^{(M)}=1$;
   (4) $\mathcal{H}_M = \mathcal{H}_{M-1} \cup \{h_M\}$; If $J_M^{min} > J(H_m)$ then $J_M^{min}=J(H_M)$;

3. (Conditional Exclusion)
   (1) h'=arg $\min_{h \in H_M} J(H_M-h)$; // h' is the least significant feature in $\mathcal{H}_M$
   (2)

If $J(H - h') < J_{M-1}^{min}$ then (a) $H_{M-1}=H_M-h'$; M=M−1;

$$J_{M-1}^{min} = J(H_M - h'); M = M - 1$$

(b) if h'=$h_m$', then re-calculate $w_i^{(j)}$ and $h_j$ for j=m' ... M;
   (c) go to 3.(1);
   (3) else
   (a) if M=$M_{max}$ or $J(H_m)$ <J*, then go to 4;
   (b) go to 2.(1);

4. (Output)

$$H(x) = \text{sign}\left[\sum_{m=1}^{M} h_m(x)\right].$$

In Step 2 (forward inclusion), the currently most significant weak classifier is added one at a time, which is the same as in AdaBoost. In Step 3 (Conditional Exclusion), FloatBoost removes the least significant weak classifier from $H_M$, subject to the condition that the removal leads to a lower cost than $$J_{M-1}^{min}$$

(which is not done in AdaBoost). Supposing that the removed weak classifier was the m'-th in $\mathcal{H}_M$, then $h_{m'}, \ldots, h_M$ will be re-learned. This is repeated until no more removals can be done.

2.2 FloatBoost Applied to Face Detection

As mentioned previously, boosting algorithms can be applied to many machine learning applications. The boosting procedure of the invention will be described in terms of face detection. As such, some background information on boosting procedures and face detection systems is useful.

2.2.1 Background Information on Face Detection

Face detection systems essentially operate by scanning an image for regions having attributes that would indicate that a region contains a person's face. These systems operate by comparing some type of training images depicting people's faces (or representations thereof) to an image or representation of a person's face extracted from an input image. Furthermore, face detection has remained a challenging problem especially for non-frontal view faces. This challenge is firstly due to the large amount of variation and complexity brought about by the changes in facial appearance, lighting and expression [1,26]. Changes in facial view (head pose) further complicate the situation because the distribution of non-frontal faces in the image space is much more dispersed and more complicated than that of frontal faces. Learning based methods have so far been the most effective ones for face detection. Most face detection systems learn to classify between face and non-face by template matching. They treat face detection as an intrinsically two-dimensional (2-D) problem, taking advantage of the fact that faces are highly correlated. It is assumed that some low-dimensional features that may be derived from a set of prototype or training face images can describe human faces. From a pattern recognition viewpoint, two issues are essential in face detection: (i) feature selection, and (ii) classifier design in view of the selected features.

A procedure developed by Freund and Shapire [4], referred to as AdaBoost, has been an effective learning method for many pattern classification problems, to include face detection. AdaBoost is a sequential forward search procedure using the greedy selection strategy. Its heuristic assumption is monotonicity, i.e. that when adding a new feature to the current set, the value of the performance criterion does not decrease. The premise offered by this sequential procedure can be broken-down when the assumption is violated, i.e. when the performance criterion function is non-monotonic. As a sequential search algorithm, AdaBoost can suffer from local optima when the evaluation criterion is non-monotonic.

Another issue is real-time multi-view face detection. Previous face detections systems, especially any that can detect faces in multiple viewpoints, are very slow, too slow to be used for real time applications. Most existing works in face detection, including Viola et al. [31] deal with frontal faces. Sung and Poggio [29] partition the frontal face and non-face image spaces each into several probability clusters, derive feature vectors in these subspaces, and then train neural networks to classify between face and nonface. Rowley et al [20] trained retinally connected neural networks using preprocessed image pixel values directly. Osuna el al [15] apply the support vector machines algorithm to train a neural network to classify face and non-face patterns. Roth et al. [19] use a learning architecture specifically tailored for learning in the presence of a very large number of features for the face and non-face classification.

In Viola et al. [31], simple Haar-like features, used earlier in Papageorgiou [16] for pedestrian detection, are extracted; face/non-face classification is done by using a cascade of successively more complex classifiers which are trained by using the (discrete) AdaBoost learning algorithm. This resulted in the first real-time frontal face detection system which runs at about 14 frame per second for a 320×240 image [31]. However, the ability to deal with non-frontal faces is important for many real applications because, for example, statistics show that approximately 75% of the faces in home photos are non-frontal [11]. A reasonable treatment for multi-view face detection is the view-based method taught by Pentland et al. [17], in which several face models are built, each describing faces in a certain view. This way, explicit 3D modeling is avoided. Feraud et al. [3] adopt the view-based representation for face detection, and use an array of five detectors with each detector responsible for one view. Wiskott et al. [32] build elastic bunch graph templates for multi-view face detection and recognition. Gong and colleagues [6] study the trajectories of faces in linear Principal Component Analysis (PCA) feature spaces as they rotate, and use kernel support vector machines (SVMs) for multi-pose face detection and pose estimation [14,12]. Huang et al. [7] use SVM's to estimate facial poses.

The system of Schneiderman and Kanade [24] is claimed to be the first algorithm in the world for multi-view face detection. Their algorithm consists of an array of five face detectors in the view-based framework. Each is constructed using statistics of products of histograms computed from examples of the respective view. However, it is very slow and takes one minute to work on a 320×240 pixel image over only four octaves of candidate size [24].

2.2.2 FloatBoost Applied to Detector-Pyramid Face Detection System and Method

The application of FloatBoost to face detection will now be described as it applies to a detector-pyramid architecture designed to efficiently detect multi-view faces. This detector-pyramid system and method is the subject of a co-pending application entitled "A SYSTEM AND METHOD FOR MULTI-VIEW FACE DETECTION", which has the same inventors as this application and which is assigned to a common assignee. The co-pending application was filed on Mar. 4, 2002 and assigned Ser. No. 10,091,100.

In the system and method of the co-pending application, a coarse to fine strategy is used in that a sub-window is processed from the top to bottom of a detector pyramid by a sequence of increasingly more complex face/non-face classifiers designed for increasingly finer ranges of facial view. This strategy goes beyond the straightforward view-based method in that a vast number of nonface sub-windows can be discarded very quickly with very little loss of face sub-windows. This is very important for fast face detection because only a tiny proportion of sub-windows are of faces. Since a large number of nonface sub windows are discarded the processing time for face detection is significantly reduced. The multi-view face detection system employing FloatBoost is distinguished from previous face detection systems in its ability to detect multi-view faces in real-time. It is designed based on the following thinking: While it is extremely difficult to distinguish multi-view faces from non-face images clearly using a single classifier, it is less difficult to classify between frontal faces and non-faces as well as between multi-view faces and parts of non-faces. Therefore, narrowing down the range of view makes face detection easier and more accurate for that view.

Figure 3:
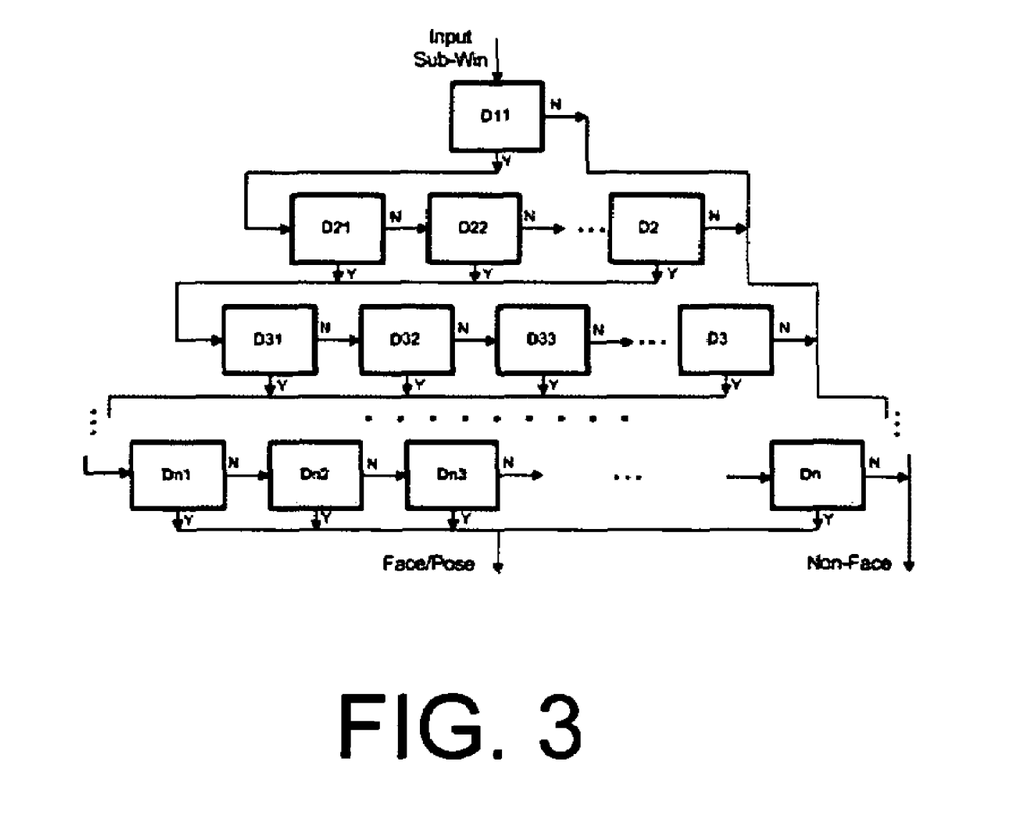
FIG. 3 is a diagram illustrating the general detector-pyramid architecture of a face detection system and process employing the boosting process of the system and method of the invention.

More specifically, the detector-pyramid architecture, generally shown in FIG. 3, adopts the coarse to fine (top-down in the pyramid) strategy in that the fill range of facial views is partitioned into increasingly narrower ranges at each detector level, and thereby the face space is partitioned into increasingly smaller subspaces. Also, a simple-to-complex strategy is adopted in that the earlier detectors that initially examine the input sub-window are simpler and so are able to reject a vast number of non-face sub-windows quickly, whereas the detectors in the later stages are more complex and involved and spend more time to scrutinize only a relatively tiny number of remaining sub-windows.

The multi-view face detection system employing FloatBoost can be generalized as follows. Images of face and non-face examples are captured to be used as a training set. A pyramid of detectors, increasing in sophistication and complexity and partitioned into finer and finer pose ranges from top down, are trained. Then, an input image is prepared for input into the detector pyramid by extracting sub-windows from the input image into sub-windows. Each of these sub-windows is then input into the detector pyramid. For each input sub-window the system determines whether the sub-window is a face, and if so, its pose range. If more than one detector of the present invention detects a face at close to the same location then the system arbitrates the outputs for the detectors with overlapping detections. The following paragraphs detail the generalized process actions discussed above.

As with most face detection system, the face detection system and process employing the detector pyramid must first be trained before it can detect face regions in an input image. This training phase generally involves first capturing face and non-face images. As will be explained later, these captured face and non-face images are used to train a detector-pyramid that employs a sequence of increasingly more complex face/non-face classifiers designed for detecting increasingly finer ranges of facial views. Each classifier is dedicated to detecting a particular pose range. Accordingly, the captured training face images should depict people having a variety of face poses.

The captured training face images are preprocessed to prepare them for input into the detector pyramid. In general, this involves normalizing and cropping the training images. Additionally, the training images are roughly aligned by using the eyes and mouth. Normalizing the training images preferably entails normalizing the scale of the images by resizing the images. It is noted that this action could be skipped if the images are captured at the desired scale thus eliminating the need for resizing. The desired scale for the face is approximately the size of the smallest face region expected to be found in the input images being searched. In a tested embodiment, an image size of about 20 by 20 pixels was used with success. These normalization actions are performed so that each of the training images generally match as to orientation and size. The face training images (but not the non-face training images) are also preferably cropped to eliminate unneeded portions of the image that could contribute to noise in the training process. It is noted that the training images could be cropped first and then normalized.

Figure 4:
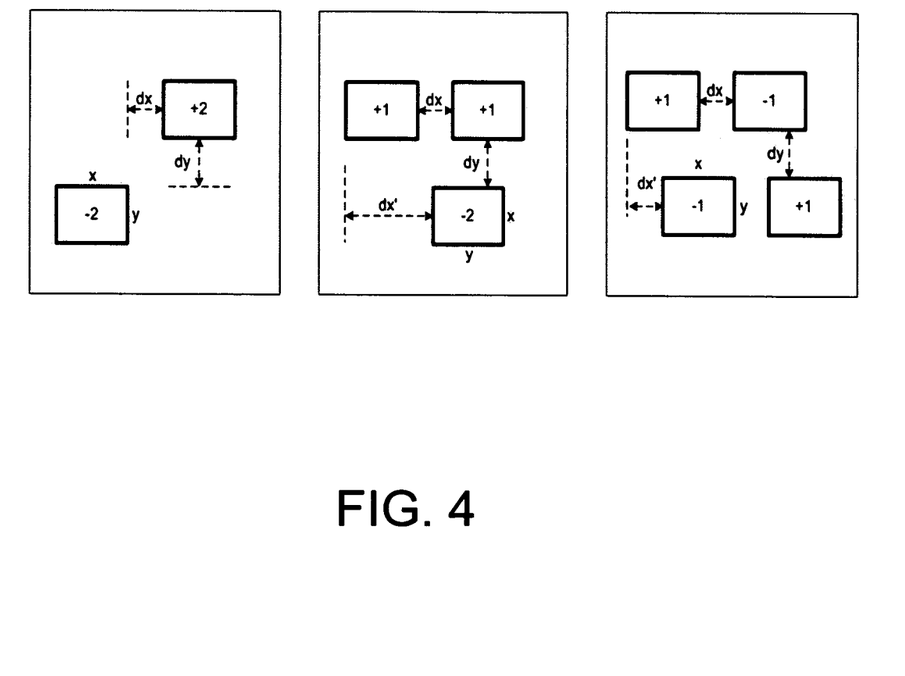
FIG. 4 is a diagram depicting three types of simple features shown relative to a sub-window.

The high speed and detection rate depend not only on the detector-pyramid architecture, but also on the individual detectors. Three types of simple features, which are block differences similar to steerable filters, are computed as shown in FIG. 4. The three types of simple features are shown relative to a sub-window. The sum of the pixels which lie within the white rectangles are subtracted from the sum of pixels in the black rectangles. Each such feature has a scalar value that can be computed very efficiently from the summed-area table [10] or integral image [3]. These features may be non-symmetrical to cater to nonsymmetrical characteristics of non-frontal faces. They have more degrees of freedom in their configurations than the previous use, which is 4 (x, y, dx, dy) in the two block features and 5 (x, y, dx, dx',0, dy) in the three and four block features, where dx and dx' can take on negative values whereas the others are constrained to positive values only. There are a total number of 102,979 two-block features for a sub-window of size 20×20 pixels. There are a total number of 188,366 three-block features (with some restrictions to their freedom). FIG. 4 depicts the three types of simple Harr wavelet like features defined in a sub-window. The rectangles are of size x by y and are at distances of (dx, dy) apart. Each feature takes a value calculated by the weighted (±1; 2) sum of the pixels in the rectangles.

A face/nonface classifier is constructed based on a number of weak classifiers where a weak classifier performs face/non-face classification using a different single feature, e.g. by thresholding the scalar value of the feature according the face/non-face histograms of the feature. A detector can be one or a cascade of face/nonface classifiers, as in [3]. A more technically detailed description of feature selection and detector training using the FloatBoost procedure will be discussed shortly.

The detectors in the pyramid are trained separately, using different training sets. An individual detector is responsible for one view range, with possible partial overlapping with its neighboring detectors. Due to the symmetry of faces, it is necessary to train side view detectors for one-side only, and mirror the trained models for the other side. For one feature used in left-side view, its structure is mirrored to construct a new feature used for right-side view. Each left-side view feature is mirrored this way, and these new features are combined to construct right side view detectors. Making use of the symmetry of faces, it is necessary to train, for each level, the frontal view detector plus those of non-frontal views on one side. Therefore, assuming there are L (an odd number) detectors at a level, it is necessary to train only (L+1)/2 detectors. The corresponding models for the other side can be obtained by mirroring the features selected for this side. So, 7 detectors are trained for a detector-pyramid composed of 11 detectors.

The multi-view face detection system and method classifies images based on the value of simple features. The FloatBoost system and method uses a combination of weak classifiers derived from tens of thousands of features to construct a powerful detector. To summarize the above, the construction of the detector-pyramid is done in the following way:

1. Simple features are designed. There are a number of candidate features.
2. A subset of the features is selected and the corresponding weak classifiers are taught using FloatBoost.
3. A strong classifier is constructed as a linear combination of the weak classifiers, as the output of FloatBoost learning.
4. A detector is composed of one, or a cascade, of strong classifiers.
5. At each level of the pyramid, the full range of face poses (out-of-plane rotation) is partitioned into a number of sub-ranges, and the same number of detectors are trained for face detection in that partition, each specialized for a certain pose sub-range.
6. Finally, the detector-pyramid is composed of several levels from the coarsest view partition at the top to the finest partition at the bottom.

Therefore, using FloatBoost, the detectors in the pyramid are trained separately using separate training sets. An individual detector is responsible for one view/pose range, with possible partial overlapping with its neighboring detectors.

Once the system is trained it is ready to accept prepared input image regions and to indicate if the region depicts a face, even if the face is non-frontal in the image.

2.2.3 Detailed Description of FloatBoost Procedure

This section provides a mathematical description of the FloatBoost boosting procedure as it applies to a face detection application. It should be noted that although this boosting method is described here with respect to its applicability to face detection, the FloatBoost procedure has applicability to many other applications including speech recognition, text classification, document routing, online learning and medical diagnosis.

The multi-view face detection task is the following: Given the input image I, find the locations of all faces in I and give the scale and pose of each found face. Denote the existence of a face by the state S=(u, v, s, θ) where (u, v) is relative translation in the image plane, s the size (scale) of the rectangular sub-window containing a face, and θ is the pose.

Multi-view face detection can be done in three steps: First, scan I exhaustively at all possible locations and scales, resulting in a large number of sub-windows x=x(u, v, s | I). Second, for each x, test if it is a face at pose θ.

$$\begin{aligned} &\text{face at pose } \theta \\ &\geq \\ &h^\theta(x) < 0 \\ &\text{otherwise} \end{aligned} \qquad (1)$$

Third, post-process to merge multiple detections.

In this section, a statistical framework for learning such a classification function h(x) is presented For the time being, face-nonface classification only is considered and the pose θ is dropped out.

2.2.3.1 Learning Classification Function

For the two class problems, a set of N labeled training examples $(x_1; y_1), \ldots (x_N; y_N)$ is given, where $y_i \in \{+1,-1\}$ is the class label associated with example $x_i$. For face detection, $x_i$ is an image sub-window of a fixed size (e.g. 20×20) containing an instance of the face ($y_i$=+1) or nonface ($y_i$=−1) pattern. In the notion of Real AdaBoost [22,5], a stronger classifier is a linear combination of weak classifiers $$H_M(x) = \sum_{m=1}^{M} h_m(x) \qquad (2)$$

where $h_m(x) \in \Re$ are weak classifiers. The class label for a test x is obtained as $H(x)=\text{sign}[H_M(x)]$ (an error occurs when $H(x) \neq y$) while the magnitude $|h(x)|$ indicates the confidence.

In boosting learning [4], each example $x_i$ is associated with a weight $w_i$, and the weights are updated dynamically using a multiplicative rule according to the errors in previous learning so that more emphasis is placed on those examples which are erroneously classified by the weak classifiers learned previously. This way, the new weak classifiers will pay more attention to those examples. The stronger classifier is obtained as a proper linear combination of the weak classifiers.

2.2.3.2 Learning Weak Classifiers

Here, the following discussion deals with how to derive a (usually large) set of candidate weak classifiers given the (normalized) weights w, and then choose $h_m(x)$ from the set. The "margin" of example (x, y) achieved by h(x) (a single or a combination of weak classifiers) on the training examples can be defined as yh(x) [21]. This can be considered as a measure of the confidence of the h's prediction. The following criterion measures the bound on classification error [22]

$$J(h(x)) = E_w(e^{-yh(x)}) = \sum_i e^{-y_i h(x_i)} \quad (3)$$

where $E_w( )$ stands for the mathematical expectation with respect to w over the examples $(x_i; y_i)$.

The weak classifiers $h_m(x)$ in Eq.(2) are derived stage-wise as the minimizers of J(h). Given the current estimate h(x), an improved estimate h(x)+h*(x) is sought by minimizing J(h(x)+h*(x)) with respect to h*(x). It is shown in [5] that the minimizer is $$h^*(x) = \frac{1}{2}\log\frac{P(y=+1\mid x, w)}{P(y=-1\mid x, w)} \quad (4)$$

$$= \frac{1}{2}\log\frac{P_j(y=+1)P_j(x\mid y=+1, w)}{P_j(y=+1)P_j(x\mid y=+1, w)} \quad (5)$$

This result provides a basis for the subsequent constructions of $h_j^*(x)$. However, the estimates of P(x|y=+1, w) and P(x|y=−1, w) are not available. Therefore, another approach is chosen for the derivation of h*(x).

A large number of simple features are defined for the sub-window x of a fixed shape and size (cf. [33] and the next section), and each simple feature, denoted as $x^k$, takes on a real scalar value. In the following, a candidate weak classifier $h_j(x)$ is derived for each single different feature j.

The probability densities of feature j for a sample sub-window x is denoted by $P_j(x|y=+1)$ for the face pattern and $P_j(x|y=-1)$ for the non-face pattern. The two densities can be estimated using the histograms resulting from weighted voting of the training examples. The candidate weak classifiers are designed as $$h_j^*(x) == \frac{1}{2}\left[\log\frac{P_j(x\mid y=+1, w)}{P_j(x\mid y=-1, w)} + \log\frac{P(y=+1)}{P(y=-1)}\right] \quad (6)$$

$$= L_j(x) - T \quad (7)$$

The half log likelihood ratio $L_j(x)$ is learned from the training examples of the two classes, and the threshold T can be adjusted to control the balance between the detection and false alarm rates in the case when the prior probabilities are not known.

The set of the derived weak classifiers, given the weights w, is denoted by $\mathcal{H}_M = \{h_1 \ldots h_M\}$. Given the current $$H_{M-1}(x) = \sum_{m=1}^{M-1} h_m(x),$$

the best $h_M(x)$ for the new strong classifier $H_M(x) = H_{M-1}(x) + h_M(x)$ is $$h_M = \underset{h^*}{\arg\min} J(h(x) + h^*(x)) \quad (8)$$

By this, a sequence of weak classifiers is derived for the boosted classifier $H_M(x)$ of Eq.(2).

2.2.3.3 FloatBoost Learning

FloatBoost incorporates the idea of Floating Search [18] into AdaBoost [4,22,5] to overcome the non-monotocity problems associated with AdaBoost. Floating Search [18] is a sequential feature selection procedure with backtracking, aimed to deal with non-monotonic criterion functions for feature selection. Feature selection with a non-monotonic criterion may be dealt with by using a more sophisticated technique, called plus-l-minus-r, which adds or deletes l features and then backtracks r steps [28,10]. The Sequential Floating Search method [18] allows the number of backtracking steps to be controlled instead of being fixed beforehand. Specifically, it adds or deletes l=1 feature and then backtracks r steps where r depends on the current situation. It is such a flexibility that amends limitations due to the non-monotonicity problem. Improvement on the quality of selected features is gained with the cost of increased computation due to the extended search. The SFFS algorithm performs very well in several applications [18,9]. The idea of Floating Search is further developed in [27] by allowing more flexibility for the determination of l.

These feature selection methods, however, do not address the problem of (sub-) optimal classifier design based on the selected features. FloatBoost combines them into AdaBoost for both effective feature selection and classifier design.

Again, applying the FloatBoost learning procedure to the face detection problem discussed above the actions of training inputs, initialization, forward inclusion, conditional exclusion and output are performed to construct the strong classifier H(x)=sign $$\left[\sum_{m=1}^{M} h_m(x)\right].$$

For face detection, the acceptable cost J* is the maximum allowable risk, which can be defined as a weighted sum of missing rate and false alarm rate. The algorithm terminates when the cost is below J* or the maximum number M of weak classifiers is reached.

FloatBoost usually needs fewer weak classifiers than AdaBoost to achieve a given objective J*. One has two options with such a result: (1) Use the FloatBoost-trained strong classifier with its fewer weak classifiers to achieve similar performance as can be done by a AdaBoost-trained classifier with more weak classifiers. (2) Continue Float-Boost learning to add more weak classifiers even if the performance on the training data does not increase. The reason for (2) is that even if the performance does not improve on the training data, adding more weak classifiers may lead to improvements on test data [24].

REFERENCES

1. M. Bichsel and A. P. Pentland. "Human face recognition and the face image set's topology". CVGIP: Image Understanding, 59:254–261, 1994.
2. W. Fan, S. Stolfo and J. Zhang. "The application of AdaBoost for Distributed, Scalable and On-line Learning", pages 362–366, In ACM 1999.
3. J. Feraud, O. Bernier, and M. Collobert. "A fast and accurate face detector for indexation of face images". In Proc. Fourth IEEE Int. Conf on Automatic Face and Gesture Recognition, Grenoble, 2000.
4. Y. Freund and R. Schapire. "A decision-theoretic generalization of on-line learning and an application to boosting". Journal of Computer and System Sciences, 55(1): 119–139, August 1997.
5. J. Friedman, T. Hastie, and R. Tibshirani. "Additive logistic regression: a statistical view of boosting". Technical report, Department of Statistics, Sequoia Hall, Stanford Univerity, July 1998.
6. S. Gong, S. McKenna, and J. Collins. "An investigation into face pose distribution". In Proc. IEEE International Conference on Face and Gesture Recognition, Vermont, 1996.
7. J. Huang, X. Shao, and H. Wechsler. "Face pose discrimination using support vector machines (SVM)". In Proceedings of International Conference Pattern Recognition, Brisbane, Queensland, Australia, 1998.
8. R. Iyer, D. Lewis, R. Schapire, Y. Singer, A. Singhal, "Boosting for document routing". Ninth International Conference on Information and Knowledge Management, 2000.
9. A. Jain and D. Zongker. "Feature selection: evaluation, application, and small sample performance". IEEE Trans. on PAMI, 19(2):153–158, 1997.
10. J. Kittler. "Feature set search algorithm". In C. H. Chen, editor, Pattern Recognition in Practice, pages 41–60. North Holland, Sijthoff and Noordhoof, 1980.
11. A. Kuchinsky, C. Pering, M. L. Creech, D. Freeze, B. Serra, and J. Gwizdka. "FotoFile: A consumer multimedia organization and retrieval system". In Proc. ACM HCI'99 Conference, 1999.
12. Y. M. Li, S. G. Gong, and H. Liddell. "Support vector regression and classification based multi-view face detection and recognition". In IEEE Int. Conf. Of Face & Gesture Recognition, pages 300–305, France, March 2000.
13. P. Moreno, B. Logan and B. Raj. "A boosting approach for confidence scoring". Cambridge Research Laboratory, Technical Report Series, CRL 2001/08, July 2001.
14. J. Ng and S. Gong. "Performing multi-view face detection and pose estimation using a composite support vector machine across the view sphere". In Proc. IEEE International Workshop on Recognition, Analysis, and Tracking of Faces and Gestures in Real-Time Systems, pages 14–21, Corfu, Greece, September 1999.
15. E. Osuna, R. Freund, and F. Girosi. "Training support vector machines: An application to face detection". In CVPR, pages 130–136, 1997.
16. C. P. Papageorgiou, M. Oren, and T. Poggio. "A general framework for object detection". In Proceedings of IEEE International Conference on Computer Vision, pages 555–562, Bombay, India, 1998.
17. A. P. Pentland, B. Moghaddam, and T. Starner. "View-based and modular eigenspaces for face recognition". In Proceedings of IEEE Computer Society Conference on Computer Vision and Pattern Recognition, pages 84–91, 1994.
18. P. Pudil, J. Novovicova, and J. Kittler. Floating search methods in feature selection. Pattern Recognition Letters, 15(11):1119–1125, 1994.
19. D. Roth, M. Yang, and N. Ahuja. "A snow-based face detector". In Proceedings of Neural Information Processing Systems, 2000.
20. H. A. Rowley, S. Baluja, and T. Kanade. "Neural network-based face detection". IEEE Transactions on Pattern Analysis and Machine Intelligence, 20(1):23–28, 1998.
21. R. Schapire, Y. Freund, P. Bartlett, and W. Lee. Boosting the margin: a new explanation for the effectiveness of voting methods. In Proc. 14th International Conference on Machine Learning, pages 322–330. Morgan Kaufmann, 1997.
22. R. E. Schapire and Y. Singer. "Improved boosting algorithms using confidence-rated predictions". In Proceedings of the Eleventh Annual Conference on Computational Learning Theory, pages 80–91, 1998.
23. R. E. Schapire and Y. Singer. BoosTexter: A boosting-based system for text categorization. *Machine Learning*, 39(2/3):135–168, May/June 2000.
24. H. Schneiderman and T. Kanade. "A statistical method for 3d object detection applied to faces and cars". In Proceedings of IEEE Computer Society Conference on Computer Vision and Pattern Recognition, 2000.
25. Fabrizio Sebastiani, Alessandro Sperduti, and Nicola Valdambrini. An improved boosting algorithm and its application to automated text categorization. In Arvin Agah, Jamie Callan, and Elke Rundensteiner, editors, *Proceedings of CIKM-00, 9th ACM International Conference on Information and Knowledge Management*, pages 78–85, McLean, US, 2000. ACM Press, New York, US.
26. P. Y. Simard, Y. A. L. Cun, J. S. Denker, and B. Victorri. "Transformation invariance in pattern recognition—tangent distance and tangent propagation". In G. B. Orr and K.-R. Muller, editors, Neural Networks: Tricks of the Trade. Springer, 1998.
27. P. Somol, P. Pudil, J. Novoviova, and P. Paclik. "Adaptive floating search methods in feature selection". Pattern Recognition Letters, 20:1157–1163, 1999.
28. S. D. Stearns. "On selecting features for pattern classifiers". In Proceedings of International Conference Pattern Recognition, pages 71–75, 1976.
29. K. K. Sung and T. Poggio. "Example-based learning for view-based human face detection". IEEE Transactions on Pattern Analysis and Machine Intelligence, 20(1):39–51, 1998.
30. K. Tieu and P. Viola. "Boosting image retrival". In Proceedings of IEEE Computer Society Conference on Computer Vision and Pattern Recognition, volume 1, pages 228–235, 2000.
31. P. Viola and M. Jones. "Robust real time object detection". In IEEE ICCV Workshop on Statistical and Computational Theories of Vision, Vancouver, Canada, Jul. 13, 2001.

32. L. Wiskott, J. Fellous, N. Kruger, and C. V. Malsburg. "Face recognition by elastic bunch graph matching". IEEE Transactions on Pattern Analysis and Machine Intelligence, 19(7):775–779, 1997.

What is claimed is:

1. A computer-readable medium having computer-executable instructions for boosting the performance of a classifier in a statistical based machine learning system, said computer executable instructions comprising:

identifying a set of weak classifiers each of which is associated with a feature found in a plurality of training examples, said weak classifiers collectively best classifying the training examples;

linearly combining each of the weak classifiers in the identified set of weak classifiers to define a strong classifier, wherein the action of identifying the set of weak classifiers comprises using a sequential forward search for optimal weak classifiers with backtracking to ensure the inclusion of a weak classifier in the set of weak classifiers does not result in lower overall performance in the form of increased processing time.

* * * * *